United States Patent [19]
Norbury

[11] Patent Number: 5,636,902
[45] Date of Patent: Jun. 10, 1997

[54] ATTACHABLE SELF-DUMPING BIN FOR A PICK-UP TRUCK

[76] Inventor: Steven A. Norbury, 9601 Blue Spruce, St. Jacob, Ill. 62281

[21] Appl. No.: 671,206

[22] Filed: Jun. 27, 1996

[51] Int. Cl.$^6$ ................................ B60P 1/24
[52] U.S. Cl. .............. 298/12; 298/15; 414/477; 414/534
[58] Field of Search ............... 298/1 A, 12, 15; 414/477, 534

[56] References Cited

U.S. PATENT DOCUMENTS

| | | | |
|---|---|---|---|
| 1,755,803 | 4/1930 | Anthony | 298/12 |
| 2,621,814 | 12/1952 | Lisota | 298/12 X |
| 3,630,571 | 12/1971 | Saldana | 298/1 A X |
| 4,084,851 | 4/1978 | Duncan, Sr. | 298/1 A X |
| 4,647,110 | 3/1987 | McKee | 298/1 A |
| 4,681,371 | 7/1987 | Leonard | 298/1 A |
| 5,192,189 | 3/1993 | Murata et al. | 414/477 |

Primary Examiner—Karen B. Merritt
Assistant Examiner—Janice L. Krizek
Attorney, Agent, or Firm—Don W. Weber

[57] ABSTRACT

An attachable dumping device is presented which allows for dumping rock, sand, or other materials from a pick-up truck. The device has three main parts, a bin which is attached to a bin frame which in turn is attached to a bottom frame. The bottom frame is bolted to the truck bed and pivots near the tailgate portion of the truck. The bin and bin frame are attached to the bottom frame by means of rollers. The device has a tailgate and latch for loading and unloading the material. In use, one simply opens the tailgate and causes the bin to move along the rollers until the bin is approximately one-half of the way out of the bed of the truck. The bed frame then rotates about its pivot point and the entire device is tilted to dump the material onto the ground. In repositioning the device, the bin is pushed forward until the entire device pivots back to a horizontal direction. Because the center of gravity is located at approximately the halfway point with the bin extended, unloading or repositioning the bin is done without the necessity of using much force.

5 Claims, 4 Drawing Sheets

ATTACHABLE SELF-DUMPING BIN FOR A PICK-UP TRUCK

BACKGROUND OF THE INVENTION

This invention relates to the field of carrying and dumping materials. More specifically, it presents a device which is attachable to the standard pick-up truck bed which allows a load deposited in the bin to be dumped from the truck.

In the United States and throughout the World, the use of pick-up trucks is common. These trucks usually have a rear loading area approximately five feet wide and approximately 6–8 feet long, having a side height of approximately three feet. When these trucks are used for loading materials such as dirt, gravel, larger rocks, or other materials, the method of removing the load would be to shovel the dirt or rock from the bed of the pick-up truck by hand. This often cumbersome and tiring work must be performed manually.

At least one prior inventor has directed himself to the problem of unloading material such as dirt or rock from a pick-up truck. The 1987 patent issued to Leonard (U.S. Pat. No. 4,681,371) discloses a bin insert for a pick-up truck which is capable of sliding off the bed of a pick-up truck to unload the dirt or gravel. As shown most specifically on FIG. 3 of the Leonard Patent the entire bin is pivoted near the tailgate so that the load may be removed from the pick-up truck. However, the tiltable bin of Leonard is mounted on a permanent framework. This arrangement can cause a great deal of stress both on the bolts of the frame near the cab, and on the longitudinal rails, and on the bin frame itself. Additionally, the weight of the load can cause the movement of the loaded bin to require heavy manual lifting. It is an object of this invention to provide an attachable bin and frame which allows the dirt or gravel located in the bin to be removed from the pick-up truck, which also minimizes the stress to the bed of the pick-up truck and frame. It is a further object of this invention to provide an attachable bin which may be easily maneuvered without requiring heavy lifting.

It is still another object of this invention to provide a bin and frame assembly that the bin may slide out of the bed of the truck to a pre-determined length whereupon the entire bed and frame assembly tilts to deposit the materials onto the ground.

It is a still further object of this invention to provide an easy means for dumping a load such as dirt or gravel from a pick-up truck while still allowing the basic integrity of the pick-up truck load to remain intact. Further and other objects of this invention will become apparent upon reading the below described Specification.

SUMMARY OF THE INVENTION

This invention comprises essentially three main parts: (1) a bottom frame pivotally attached to the bed of a pick-up truck; (2) a bin frame which is rollably attached to the pivotal bottom frame; and (3) a bin attached to the bin frame. The bin and bin frame are rollably attached to the bottom frame by means of bin frame rails which are adapted to receive rollers. The rollers, in turn, are attached to the bottom frame which is attached to the pick-up truck. The bottom frame is pivotally attached to the pickup truck with the pivot point of the bottom frame being near the rear end of the truck by the tailgate.

With a load located within the bin, the bin moves in a direction away from the front cab until the center of gravity of the load is approximately over the bottom frame pivot point. Stop bolts then prevent any further rearward motion of the bin. However, since the bottom frame pivots about the pivot point near the tailgate, the entire unit including the bin, bin frame and bottom frame may then tilt so that the load may be deposited on the ground by passing through the open rear tailgate. Once the load has been deposited, the unit becomes quite lightweight and easy to manage since the center of gravity of the bin is located near the pivot point of the bottom frame. Because the bottom frame pivots and because of the location of the center of gravity upon dumping, little manual force is required to empty the bin.

DETAILED DESCRIPTION OF THE PREFERRED EMBODIMENT

Figure 1:
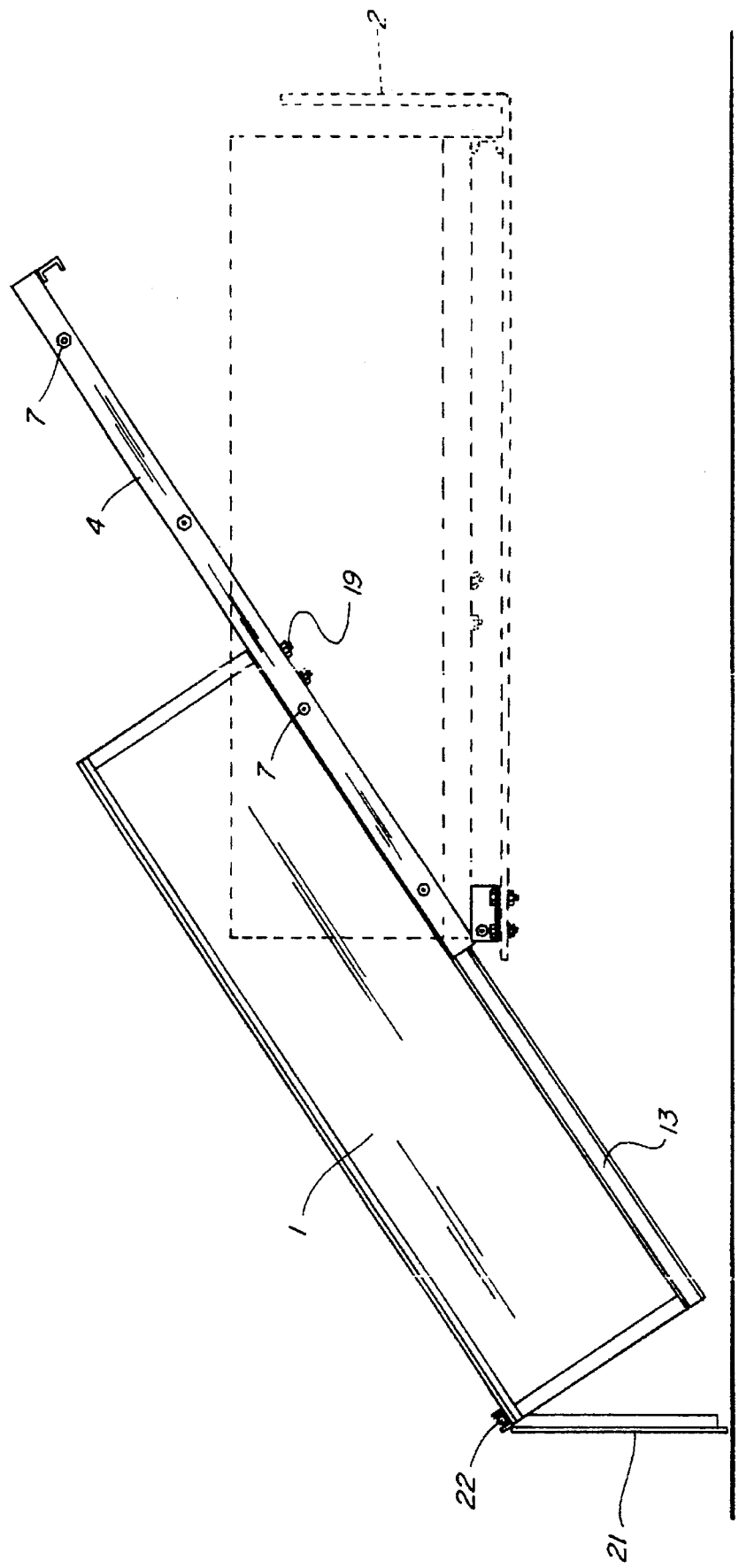
FIG. 1 is side view of the device showing the bin, bin frame, and bottom frame in the tilted position. The dotted lines of FIG. 1 show the bin, bin frame and bottom frame in the locked and secured position.

The attachable dumping bin for a pick-up is shown in FIG. 1. In general, the device comprises a dumping bin 1 located and secured to a bin frame 13. The bin 1 and bin frame 13 are rollably secured to a bottom frame 4. This bottom frame has rollers 7 spaced along its longitudinal rail. The bottom frame 13 is adapted to receive these rollers 7. The bin 1 and bin frame 13 are able to roll along the bottom frame 4 until the bin is in the approximate position shown in FIG. 1. The center of gravity of the load should then be approximately over the bottom frame pivot point. At that point, stop bolts 19 located on bottom frame longitudinal rails 5 stop the rearward motion of the bin 1. The bottom frame 4 then tilts in the manner shown in FIG. 1 about bottom frame pivot pins 9 and 9' so that the load may be dumped as shown. A rear tailgate 21 of the bin 1 pivots about point 22 to release the load.

Figure 2:
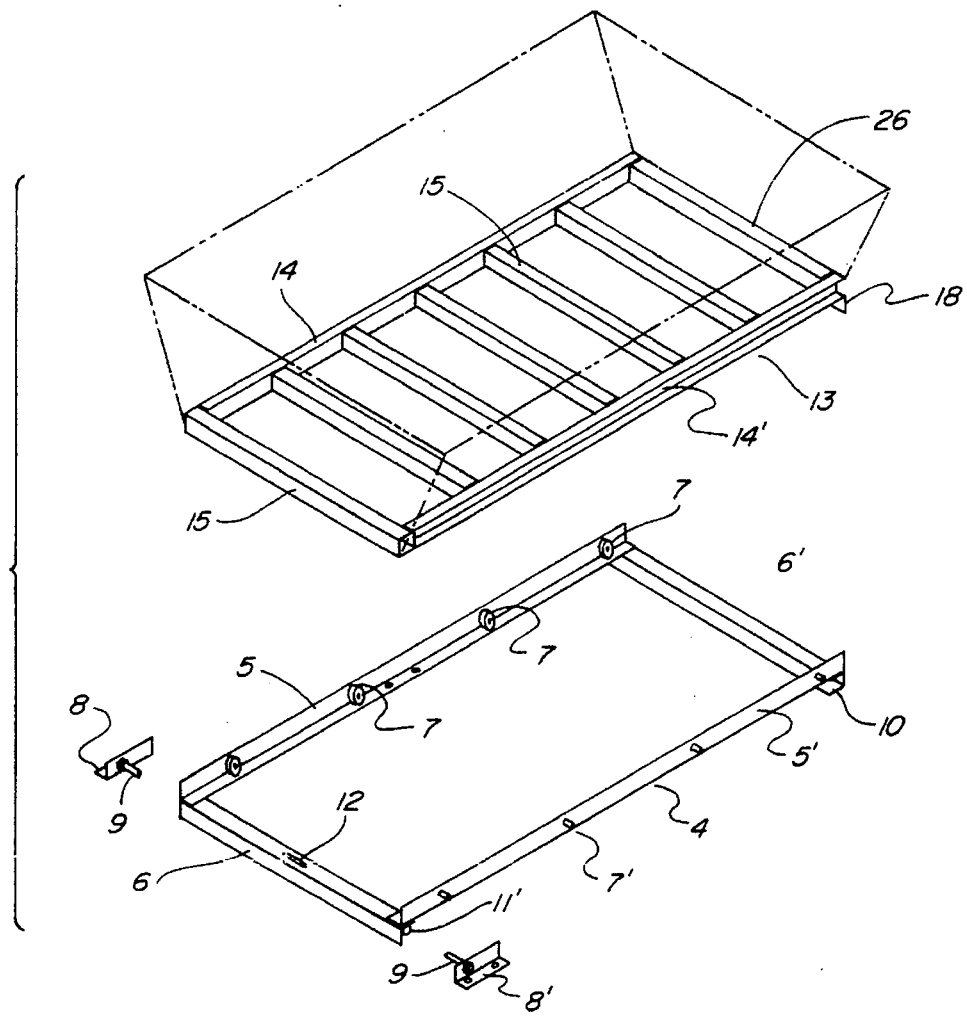
FIG. 2 is an exploded view of the bottom frame and bin frame, showing the relationship between the two frames.

Turning now to FIG. 2, both the bottom frame 4 assembly and the bin frame 13 assembly are shown.

Turning first to the bottom frame 4 assembly, it can be seen that the bottom frame comprises left 5 and right 5' longitudinal rails. These left and right longitudinal rails are connected by rear 6 and front 6' lateral rails, forming a rectangle. Spaced along the inside of each of the bottom frame longitudinal rails are a plurality of rollers 7.

Figure 3:
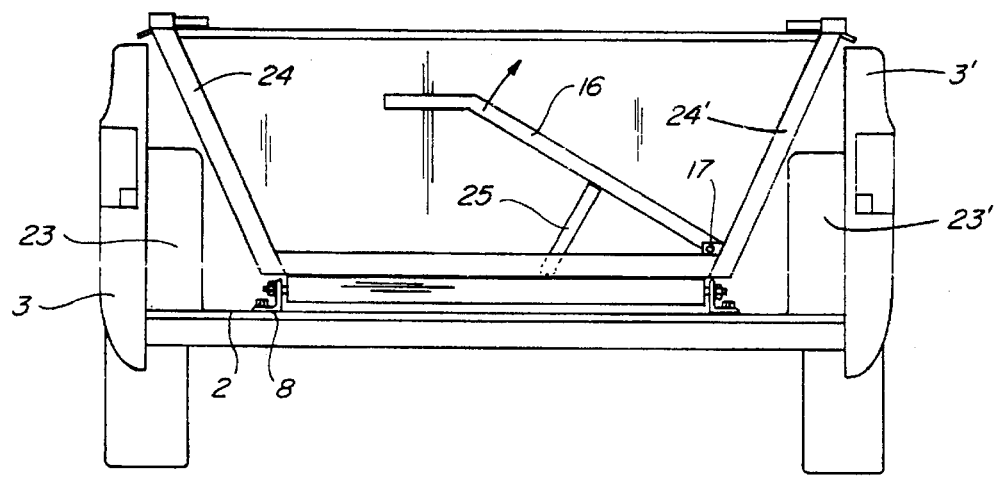
FIG. 3 is a rear view of a pick-up truck with the device installed and the tailgate of the pick-up truck removed.
Figure 4:
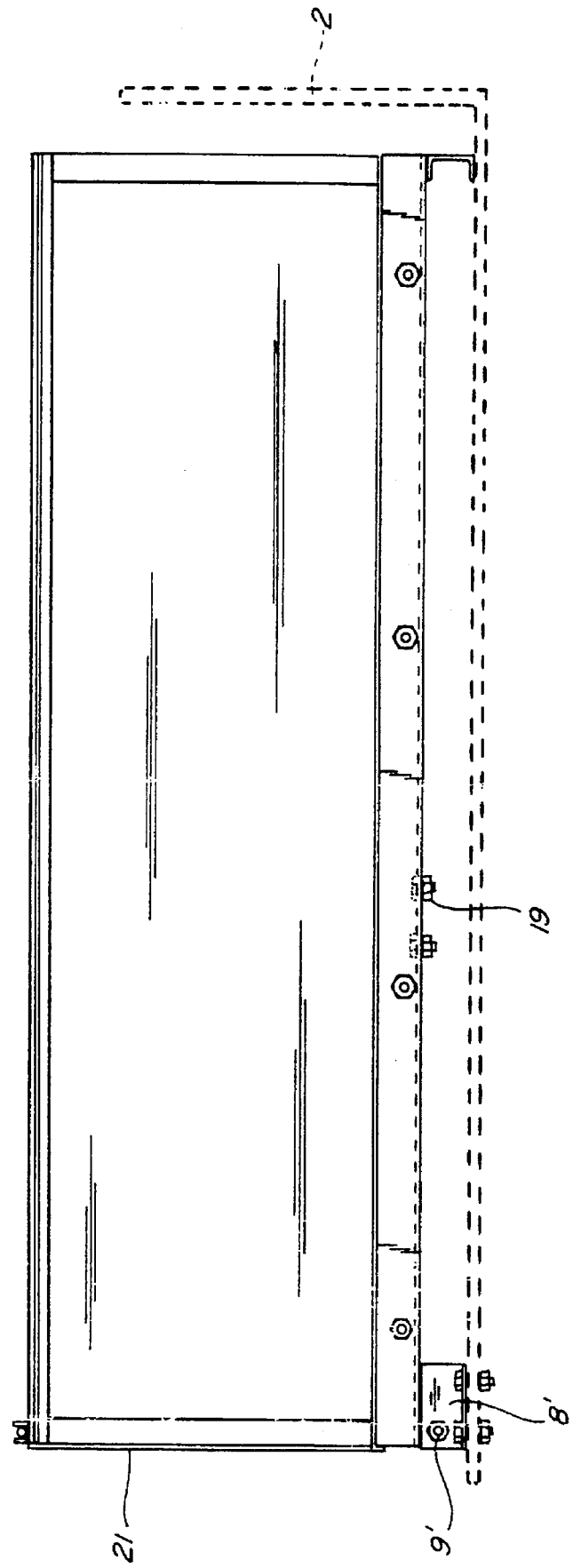
FIG. 4 is a side view of the device with the side walls of the pick-up truck cutaway to show the device as it appears installed in the bed of a pick-up truck.

As best shown in FIG. 3, the bed of a pick-up 2 is large enough so that it may receive the attachable dumping bin. The pick-up bed 2 has vertical walls 3 and 3'. The bottom frame 4 is attached to the bed 2 of the pick-up by means of left 8 and right 8' tilting brackets. As best shown on FIG. 5, these tilting brackets have attached to them left 9 and right 9' bottom frame pivot pins. The pivot pins are attached on each side of the rear bottom frame lateral rails 6 such that the rear bottom frame lateral rail 6 and bottom frame assembly pivot about the pivot pins 9 and 9'. The front bottom frame lateral rail 6' has attached to it an inverted L support such that the horizontal segment 10 of the inverted L supports the front portion of the bottom frame 4.

A circular opening 11' is secured underneath the rear lateral rail 6. A similar circular opening is secured on the other side of the bottom frame. These cylindrical openings are adapted to receive the pivot pins 9' and are the means for attaching the bottom frame, and hence the entire device, to the pick-up truck bed 2. The rear bottom frame lateral rail 6 also has a central slot 12 adapted to receive the handle latching bar 25.

Turning now to the bin frame 13, it can be seen that the bin frame comprises left 14 and right 14' longitudinal rails. These left and right longitudinal rails are connected to each other by means of a plurality of bin frame lateral rails 15.

The dumping bin 1, as best shown in FIGS. 1 and 3, also has a tailgate 21 which pivots about tailgate pivot point 22. This tailgate has secured to it a rear handle 16 which pivots about rear handle pivot point 17 and is irregularly shaped as shown in FIG. 3. This rear handle 16 also includes a rear handle latching bar 25. The rear handle latching bar 25 is adapted to be inserted into the bottom frame handle slot 12. When the handle is located as shown in FIG. 3, the bin, bin frame, and bottom frame are all secured above each other with the ends aligned and locked in place by the rear handle latching bar 25.

Attached to the bin frame front lateral rail 26 is a vertical bin frame front lateral rail stop plate 18. This front stop plate 18 is adapted to come into contact with dumping bin stop bolts 19, shown on FIG. 1, and located approximately three feet from the tailgate end of the assembly. These bottom frame stop bolts 19 are located on both left 5 and right 5' bottom frame longitudinal rails.

Figure 5:
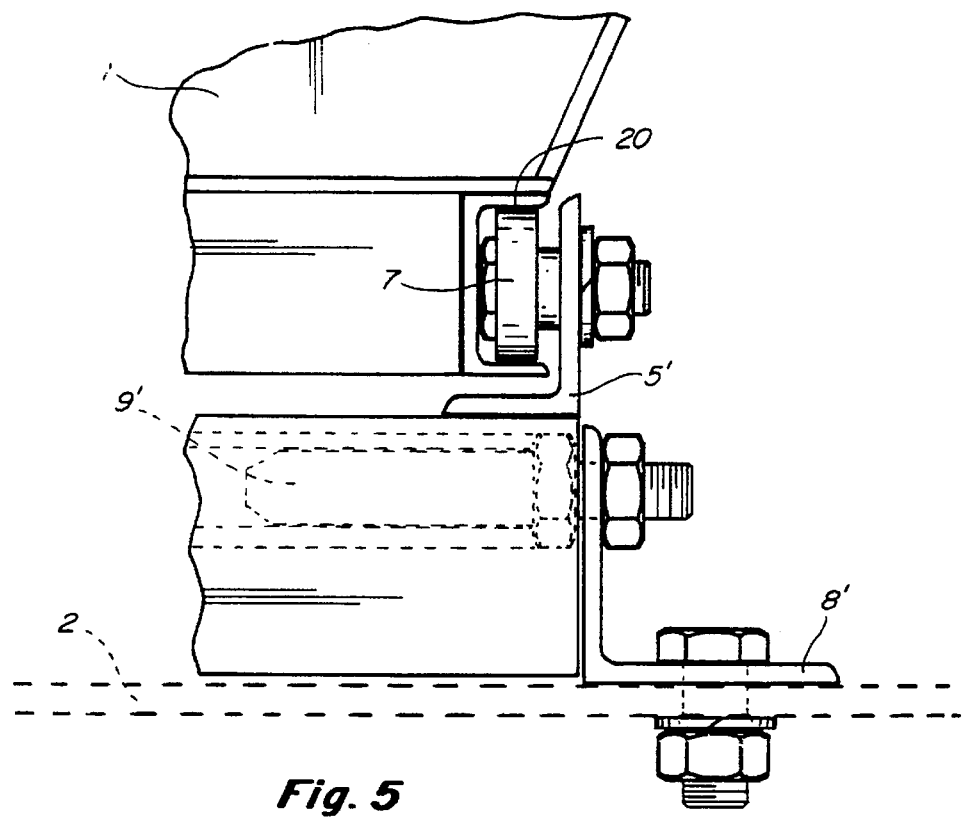
FIG. 5 is a detailed rear view of the lower right rear end of the device showing the pivoting pins for the lower frame and the rollers of the bin frame and the attaching relationship between the bin frame rollers and the bin.

Turning now to FIG. 5, the relationship between the pick-up bed 2, the bottom frame 4, the bin frame 13, and the dumping bin 1 is illustrated in detail. The tilting assembly bracket 8' and pin 9' are attached to the pick-up bed 2 by means of bolts. The bottom frame tilting bracket 8' is thus permanently affixed to the tailgate end of the pick-up bed 2. Rotatably attached to the tilting bracket 8' is a tilting bracket pivot pin 9'. This tilting bracket pivot pin is inserted into the cylindrical opening 11' of the bottom frame. The bottom frame is thus tiltably or pivotally attached to the pick-up bed 2. An identical assembly 8 and 9 is attached to the opposite side of the truck bed.

The longitudinal rail 5', secured to the lateral rail 6, is thus pivotally secured to the truck bed 2 by means of the pivot pin 9'.

Secured to the bottom frame longitudinal rail 5' are a plurality of rollers 7. The longitudinal rail 14' of the bin frame 13 includes a longitudinal bin rail C-section 20, as shown in FIG. 5. Each left and right longitudinal bin rail has attached at its end a C-section 20, as best shown in FIG. 5. These sections are adapted to receive the rollers 7. Since the C-section outer ends extend along the length of the bin frame longitudinal rails 14 and 14', the bin frame and attached bin 1 are able to be rollably moved along the bottom frame 4, as shown in FIG. 1.

Figure 6:
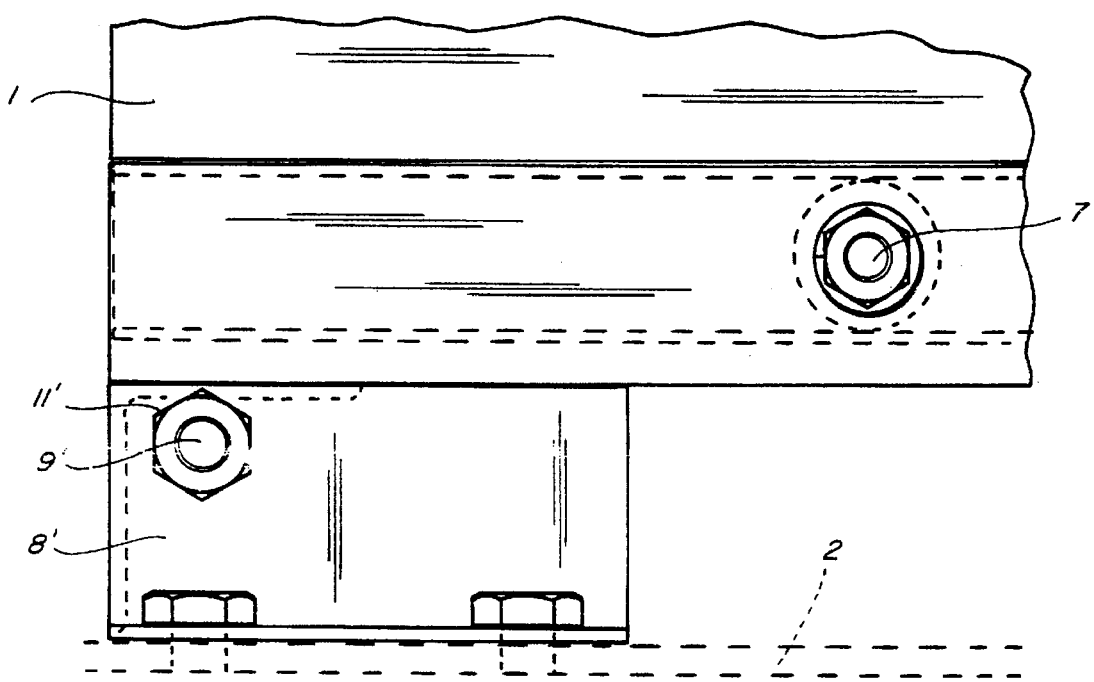
FIG. 6 is a left side view of the lower frame, bin frame, and bin showing the lower frame pivot point, rollers, and the relationship between these three main parts.

A detailed side view showing the attachment of the tailgate end of the device to the pick-up truck bed 2 is shown in FIG. 6. The attaching bracket 8' is bolted to the bed of the truck 2. The right pivot pin 9', attached to the bracket, secures the bottom frame 4 to the bed 2. The bottom frame is then rollably attached to the bin frame 13 and thus to the bin 1.

The tailgate 21, pivotally attached to the bin 1, allows for rock, sand, or dirt to exit the bin when it is tilted in the position shown in FIG. 1.

As best shown in FIG. 3, the bin 1 has a trapezoidal cross-section so that the bin 1 may be placed in the truck such that it will not impinge on the truck fender wells 23 and 23'. The oblique sides 24 and 24' of the bin 1 allow for the bin to be easily placed within the bed of a pick-up truck.

The rollers 7 are generally evenly spaced along the bottom frame longitudinal rails as shown. These rollers are adapted to receive the C-sections of the corresponding longitudinal rails of the bin frame. The bin frame longitudinal rails correspond to the bottom frame longitudinal rails, except that the bin frame rails are located inside the bottom frame rails. When in a closed position the dumping bin is located on top of the bin frame which is, in turn, located on top of the bottom frame.

The bin frame restraining means comprises essentially the front stop plate 18 and the stop bolts 19. When the bin 1 is loaded with rock, sand, gravel or other material, the approximate center of gravity of the load is such that the bin 1 will tilt the bottom frame 4 when it is extended approximately as shown in FIG. 1. In order to accomplish this, the stop bolts 19 are placed approximately three feet from the rear tailgate end of the pick-up truck bed (or approximately three feet from the pivot pins 9 and 9'). Using this relationship between the stop bolts and the length of the bin, the unloaded bin is easily placed back in the truck since the center of gravity requires only a slight forward motion of the bin 1 in order to tilt the entire weight forward, moving the bottom frame and bin into the horizontal position. Since the approximate center of gravity of a loaded bin is located approximately above the bottom frame pivot point (pivot pins 9 and 9') when the front stop plate 18 contacts the stop bolts 19, little manual force is needed to dump the loaded material or return the bin to the horizontal, closed position.

When dumping the contents of a loaded bin, the workman simply lifts the tailgate handle to unlock the bin, bin frame, and bottom frame from their locked positions. The workman could then move the pick-up truck forward or could back up the vehicle very slowly and gently apply the brakes. The bed will then extend rearwardly, away from the driver's cab until the stop plate hits the stop bolts. The weight of the loaded device would then be near the pivot point 9 and 9' of the bottom frame. The frame then pivots as shown in FIG. 1 allowing the bed to tilt downward until it contacts the ground, as shown in FIG. 1. The contents of the bin will then empty as the truck pulls slightly forward. When the bed is completely empty, lifting the bin and frame will require very little force because of the balance achieved between the extension of the bin along the rollers and the position of the entire unit about the pivot point. Sliding the bed forward until it is in place and locking the unit into its locked position will then enable the device to be reused once it is reloaded.

The bin itself has an approximately two cubic yard capacity and may be used in the home, farm, or job site. It is adapted to unload dirt, rock, sand, mulch, grain, feed, and wood. It is easily installed and would take two men approximately thirty minutes to install the device in a pick-up. Since the tailgate may be removed from its pivot point, the use of the device in dumping wood can be accomplished.

The bin frame is made of channel having dimensions of approximately two inches by one inch and a thickness of one-eighth inch. The bin itself may be made of light metal, wood, or even heavy plastic, depending upon the uses for the device. The materials and dimensions used herein are for the preferred embodiment only and are not meant as a limitation. Obviously, different dimensions of this device may be manufactured depending upon the specific requirements and dimensions of the truck bed in which the device is located. Furthermore, different materials may be used while still keeping within the spirit and disclosure of this device.

Having fully disclosed my invention, I claim:

1. A dumping bin adapted to be attached to a pick-up truck bed, comprising:
   (1) a bottom frame pivotably attached to said bed, having a plurality of longitudinal rails, each rail also comprising a plurality of spaced rollers, said longitudinal rails connected by a plurality of lateral rails;
   (2) an upper bin frame, rollably connected to said bottom frame, having a plurality of longitudinal rails corresponding to said longitudinal bottom frame rails, adapted to receive corresponding rollers of said bottom frame rails, said bin frame longitudinal rails connected by a plurality of lateral bin frame rails;
   (3) a dumping bin attached to and on top of said bin frame having a rear, pivotable bin tailgate and a rear handle for latching said bin tailgate;
   (4) stop bolts located on each bottom frame longitudinal rail; and
   (5) a bin frame restraining means;

whereby a load located in said bin may be dumped by rolling said bin on said bottom frame longitudinal rails until said restraining means contacts said stop bolts and then pivoting said bin, bin frame and bottom frame to dump said load.

2. A dumping bin adapted to be attached to a pick-up truck bed as in claim 1, wherein said stop bolts are located along said bottom frame longitudinal rails such that said bin rolls off said bottom frame until the approximate center of gravity of a loaded bin is above a point where the bottom frame is pivotably attached to the bed.

3. A dumping bin adapted to be attached to a pick-up truck bed as in claim 1, wherein said restraining means is a vertical plate fixedly attached to the bottom of the front bin frame lateral rail.

4. A dumping bin adapted to be attached to a pick-up truck bed as in claim 1, wherein the bottom frame is pivotably attached to the bed by a means for pivoting said bottom frame comprising bottom frame tilting pins, pivotally secured to the rear bottom frame lateral rail.

5. A dumping bin adapted to be attached to a pick-up truck bed as in claim 1, wherein said rear bottom frame lateral rail has a slot for receiving a handle latching bar of said handle, whereby when said latching bar is in said slot, said bin, bin frame and bottom frame are secured in place.

* * * * *